J. G. Bryan,

Hydrant.

No. 89,123.　　　　　　　　　Patented Apr. 20, 1869.

Witnesses:
William C. Bodin
Edwin F. Stives

Inventor:
John G. Bryan.
Francis D. Pastorius
Attorneys

JOHN G. BRYAN, OF PHILADELPHIA, PENNSYLVANIA.

Letters Patent No. 89,123, dated April 20, 1869.

IMPROVEMENT IN HYDRANTS.

The Schedule referred to in these Letters Patent and making part of the same.

*To all whom it may concern:*

Be it known that I, JOHN G. BRYAN, of the city and county of Philadelphia, and State of Pennsylvania, have invented a new and useful Improvement in Hydrants; and I do hereby declare that the following is a full, clear, and exact description of the same, reference being had to the accompanying sheet of drawings, and to the letters of reference marked thereon.

In this invention, the post of the hydrant is detachable from the box. The supply-pipe serves both to conduct the water and open or close the cock. The cock is contained in a chamber, which is fastened to the bottom of the hydrant-box, so that after the post and supply-pipe have been removed, the cock can be detached from the chamber by a suitable key, for the purpose of repairs, as is hereinafter shown and described.

On reference to the accompanying sheet of drawings, making part of this specification—

Similar letters refer to similar parts in the two views.

A is a hydrant, the post B of which is fitted to the box C, by taking into the flange, or collar D, at the upper end of the box.

As shown, the post is formed square, to correspond with the flange D, but both it and the collar can be of other forms.

E is a stop-cock, the chamber $a$ of which takes into a metallic box, F, fastened to the bottom of the box C of the hydrant, by means of the lugs $b$.

The chamber $a$ is retained in place by means of a tapering, or plug-screw, $c$, which is formed at its upper end, and which takes into a similar screw formed on the inner surface, at the top of the box F.

When the cock is properly fitted in the box, its water-way $d$ is directly opposite to the lower supply-pipe G.

Figure 2:
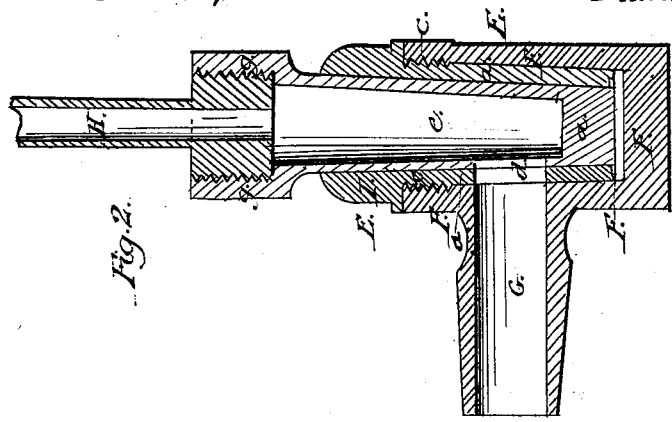
Figure 2 is a sectional view of the cock.
Figure 1:
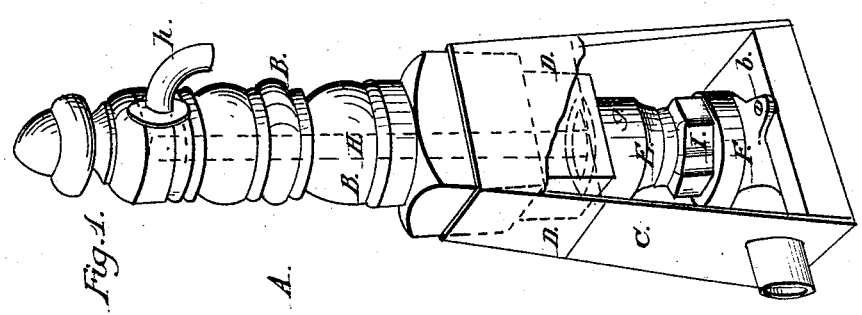
Figure 1 is a perspective view.

The plug $e$ of the cock is, as usual, made tapering, and held in the chamber $a$, by its end being riveted to the chamber, as is shown at $f$, fig. 2.

To the upper end of the plug $e$, a screw-socket, $g$, is formed, into which the supply-pipe H is screwed, or otherwise fixed. As the supply-pipe is turned in either direction by moving its nozzle $h$, the plug $e$ of the cock is either opened or closed, and the flow of water through the pipe G admitted or cut off.

The box F, by encasing the chamber $a$, protects the cock from dirt and rust, and is the means whereby the hydrant is susceptible of repairs without removing the post and digging the box out of the ground.

When repairs to the cock are required, the nozzle $h$ is unscrewed from the supply-pipe H, and the post B lifted from the box C. When a key is passed into the box, its forked end embraces the nut I of the cock. Turning the key unscrews the chamber $a$ from the box F, so that the cock can be readily lifted out for repairs, or other purposes.

In this invention, the key usually employed for regulating the passage of hydrant-water is dispensed with. The supply-pipe H, as is shown, serves for both key and supply-pipe.

What I claim as my invention, and desire to secure by Letters Patent, is—

A hydrant, consisting of the box F, screw-plug I, revolving plug $g$, delivery-pipe H, combined handle and nozzle $h$, post B, and box C, all as and for the purposes specified.

In testimony whereof, I hereunto sign my name to this specification, in presence of two subscribing witnesses.

JOHN G. BRYAN.

Witnesses:
FRANCIS D. PASTORIUS,
JOHN A. HURLEY.